United States Patent
Kilday et al.

(10) Patent No.: US 7,984,066 B1
(45) Date of Patent: Jul. 19, 2011

(54) MANDATORY ACCESS CONTROL LIST FOR MANAGED CONTENT

(75) Inventors: Roger W. Kilday, Livermore, CA (US); Aamir Farooq, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 11/393,219

(22) Filed: Mar. 30, 2006

(51) Int. Cl.
*G06F 7/00* (2006.01)

(52) U.S. Cl. ........................................ 707/781; 707/786

(58) Field of Classification Search .............. 707/9, 781, 707/786; 235/380; 713/200
See application file for complete search history.

(56) References Cited

U.S. PATENT DOCUMENTS

| | | | |
|---|---|---|---|
| 4,785,318 A * | 11/1988 | Nishikawa et al. ........... 347/141 |
| 5,911,143 A | 6/1999 | Deinhart et al. |
| 6,088,679 A | 7/2000 | Barkley |
| 7,185,010 B2 | 2/2007 | Morinville |
| 7,251,666 B2 | 7/2007 | Morinville |
| 2004/0165728 A1* | 8/2004 | Crane et al. ................... 380/279 |
| 2005/0028008 A1* | 2/2005 | Kumar ........................... 713/200 |
| 2006/0118619 A1* | 6/2006 | Hulst et al. .................... 235/380 |
| 2007/0067427 A1* | 3/2007 | Bugir et al. ................... 709/223 |
| 2007/0124409 A1* | 5/2007 | Sibert ............................. 709/216 |
| 2007/0239786 A1* | 10/2007 | Grear et al. ................. 707/104.1 |

OTHER PUBLICATIONS

Jonathon D. Moffett, "Control Principles and Role Hierarchies", 3rd ACM Workshop on Role Based Access Control (RBAC), Oct. 22-23, 1998, pp. 1-7, George Mason University, Fairfax, VA.
Giuri et al., "Role Templates for Content-Based Access Control",Fondazione Ugo Bordoni, Roma Italy 1997, pp. 153-159.
Herzberg et al., "Access Control Meets Public Key Infrastructure, OR: Assigning Roles to Strangers", 1999, IBM Research—Tel Aviv office of the Haifa Laboratory.

* cited by examiner

*Primary Examiner* — Shahid A Alam
*Assistant Examiner* — Donald Lawson
(74) *Attorney, Agent, or Firm* — Van Pelt, Yi & James LLP

(57) ABSTRACT

Restricting access to managed content to users that are both (1) members of one or more required groups identified in an ACL associated a content item to which access is requested and (2) otherwise granted access under the ACL, e.g., by virtue of their individual identity, role, or group membership is disclosed. In some embodiments, an ACL is configured to identify one or more groups as being a "required" group, membership in which is required for a user to be granted access to a content item with which the ACL is associated. If a user is not a member of a required group, the user is denied access (or denied access above a certain level), even if the user is otherwise delegated access rights in the ACL.

17 Claims, 8 Drawing Sheets

| ACL | |
|---|---|
| JOE | WRITE |
| ENG DEPT | READ |
| ADMIN | DELETE |

| ACL | |
|---|---|
| JOE | WRITE |
| ENG DEPT | READ |
| ADMIN | DELETE |
| PROJECT ALPHA | REQUIRED GROUP |

| ACL | |
|---|---|
| JOE | WRITE |
| ENG DEPT | READ |
| ADMIN | DELETE |
| PROJECT ALPHA, ENG MGR, QA TEAM | REQUIRED GROUP SET |

| ACL | |
|---|---|
| JOE | WRITE |
| ENG DEPT | READ |
| MARK | READ RESTRICT |
| ADMIN | DELETE |

| ACL | |
|---|---|
| DAN | WRITE |
| STATE DEPT | READ |
| TOP SECRET | REQUIRED GROUP |
| EUROPE REGION | REQUIRED GROUP |

MANDATORY ACCESS CONTROL LIST FOR MANAGED CONTENT

BACKGROUND OF THE INVENTION

Typically, in a content management system and in other contexts in which access to electronically stored content is restricted, a user (individual, system, application, process, etc.) is permitted to access a content item if the user is included, individually or by virtue of membership in a group, in an "access control list" (ACL) associated with the content item. Stated another way, the rights of a particular user to access a content item typically has been determined based on the union of the respective rights (if any) the user has by virtue of the individual's personal identity, role, group membership, etc. So, if an individual is listed by name or role, for example, as having "read" access to an item but is also a member of a "manager group" that has been delegated "write" access, in a typical system the user would be given "write" access.

In some contexts, however, it may be necessary and/or desired to control access in other and/or additional ways. For example, it may be desirable to grant "write" access to members of the "manager group" who are also associated with a particular product, division, geographic region, etc. Other examples of additional restrictions include ensuring access is limited to individuals who hold a particular level of security clearance, e.g., enforcing "security labels" such as "top secret", and/or other security markings or restrictions, including restricting access to users who both have a required security clearance and satisfy additional criteria established to limit access to users believed to have a legitimate "need-to-know", e.g., criteria indicated by "supplemental markings" such as "US citizens only" or "Western Europe Region only".

Therefore, there is a need for an effective way to enforce mandatory and/or supplemental access control requirements with respect to a body of managed content.

BRIEF DESCRIPTION OF THE DRAWINGS

Various embodiments of the invention are disclosed in the following detailed description and the accompanying drawings.

FIG. 8A is a block diagram illustrating an embodiment of an access control list.

FIG. 8B is a block diagram illustrating an embodiment of an access control list.

FIG. 8C is a block diagram illustrating an embodiment of an access control list.

FIG. 8D is a block diagram illustrating an embodiment of an access control list.

DETAILED DESCRIPTION

Figure 1:
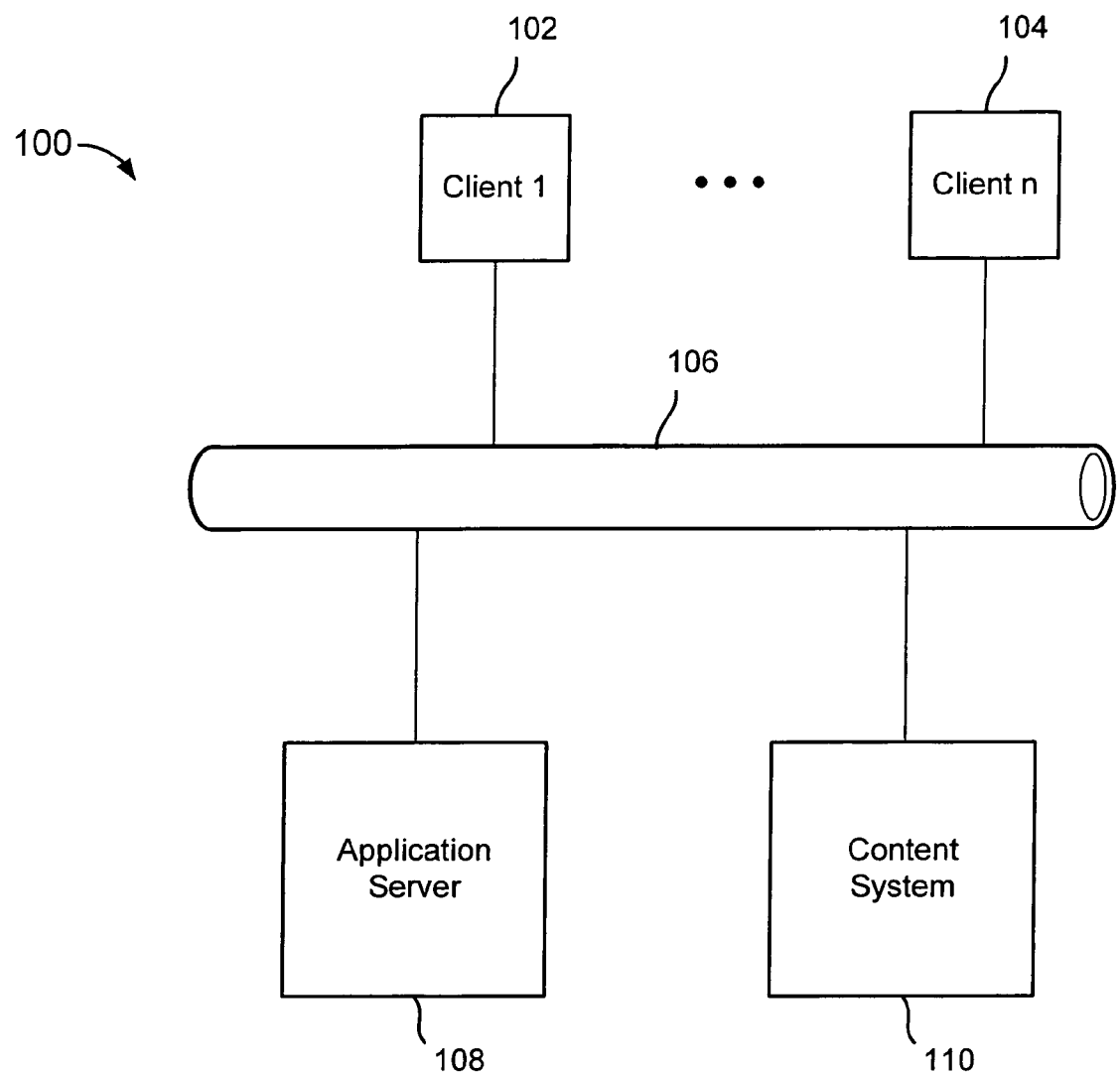
FIG. 1 is a block diagram illustrating an embodiment of a system for accessing and using managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restricting access to managed content to users that are both (1) members of one or more required groups identified in an ACL associated a content item to which access is requested and (2) otherwise granted access under the ACL, e.g., by virtue of their individual identity, role, or group membership is disclosed. In some embodiments, an ACL is configured to identify one or more groups as being a "required" group, membership in which is required for a user to be granted access to a content item with which the ACL is associated. If a user is not a member of a required group, the user is denied access (or denied access above a certain level), even if the user is otherwise delegated access rights in the ACL, e.g., by virtue of being listed in the ACL individually or by role, or by virtue of being a member of a group to which rights are granted in the ACL. In some embodiments, content management services implemented by business logic running on a content management platform (e.g., application and/or content server) are configured to enforce security as indicated by an ACL, including by denying access unless any/all required groups are satisfied. In some embodiments, membership in all required groups is a necessary but not sufficient condition to access a content item, and access must in addition be granted explicitly in the ACL to the user, e.g., by name, role, relationship to the content (author, e.g.), or membership in a group to which access has been granted. Likewise, an explicit grant of access is a necessary but not sufficient condition to access a content item; membership in any/all required groups also is required. In some embodiments, an ACL may include a "required group set", and a user must be a member of at least one group in the set in order to gain access.

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110.

Figure 2:
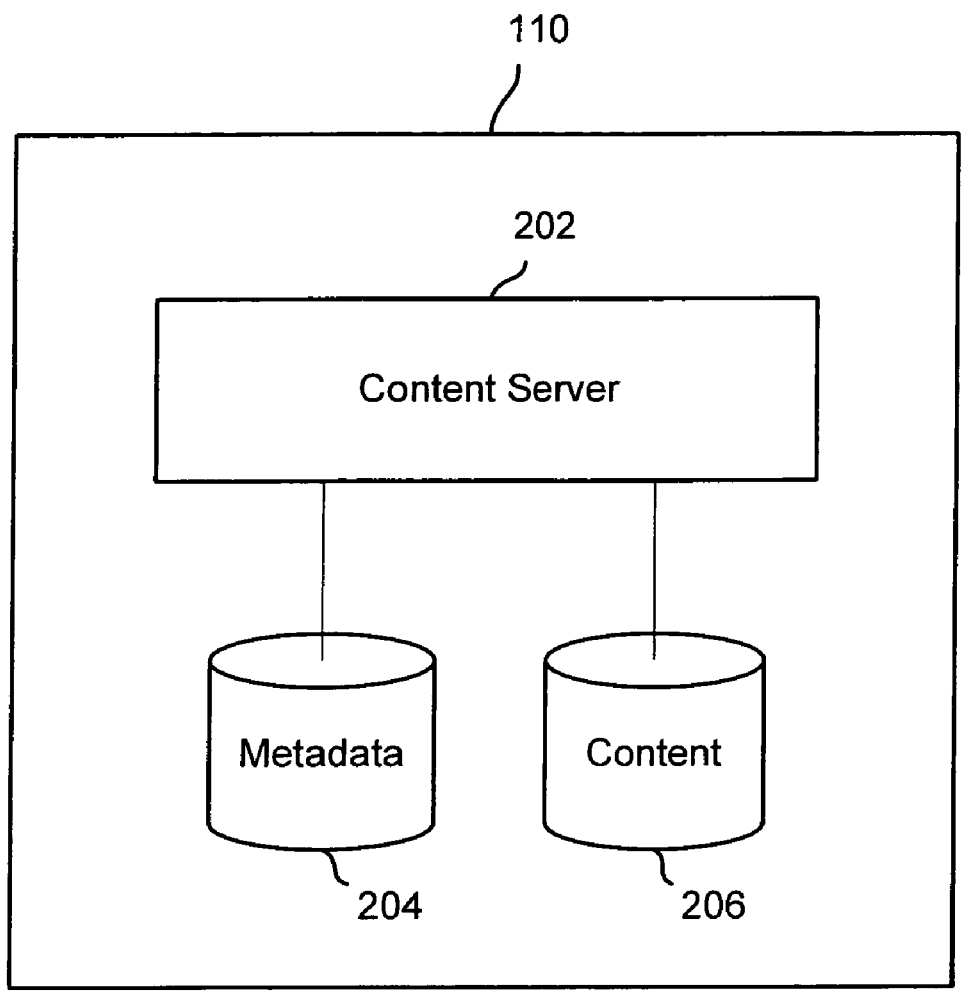
FIG. 2 is a block diagram illustrating an embodiment of a content system.

FIG. 2 is a block diagram illustrating an embodiment of a content system. In the example shown, content system 110 includes a content server 202 configured to provide access to and/or store content items, e.g., files, database tables, etc., stored in content store 206. In various embodiments, content server 202 and content store 206 reside on the same or different physical devices and/or systems, such as on separate servers or other computers. Content server 202 manages content items stored in content store 206 at least in part by associating with each of at least a subset of the content items stored in content store 206 corresponding metadata stored in metadata store 204. In some embodiments, the metadata is stored in the form of one or more software objects configured and used to represent an associated content item within a body of managed content. Examples of metadata include content item owner, author, title, date created, date last accessed, version, content type, file or data format, authoring application, recipient, sender, relationship to other content item(s), keyword(s), etc. In some embodiments, content server 202 uses the metadata to manage (e.g., track) and provide managed access to associated content items, e.g., by executing and returning results for metadata and/or full-text index based queries and providing content management functions such as check-in/check-out, versioning, save, delete, etc.

In some embodiments, one or more objects to represent a content item in metadata store 204 are created by and/or in response to a request from an application running on an associated content management framework (e.g., foundation classes, business logic, and/or API). For example, an application may populate and/or provided data values for metadata object attributes and/or provide the associated content and/or indicate to the content server a location (e.g., on the application server and/or an associated client) where the content is located. The content server stores the content in content store 206 and associates the content as stored in content store 206 with the corresponding metadata in metadata store 204.

Figure 3:
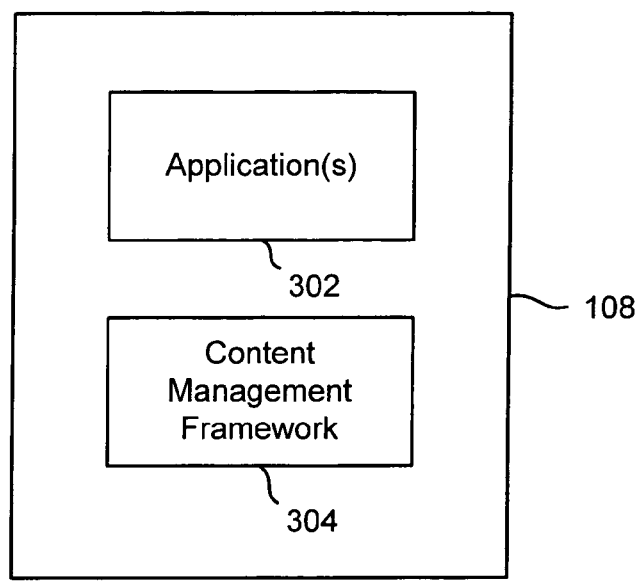
FIG. 3 is a block diagram illustrating an embodiment of an application server.

FIG. 3 is a block diagram illustrating an embodiment of an application server. In the example shown, application server 108 includes one or more applications 302 running on a content management framework 304. The application(s) use(s) the content management framework 304, e.g., an API, foundation Java classes, core content management logic and/or services, etc., to store and access managed content.

Figure 4:
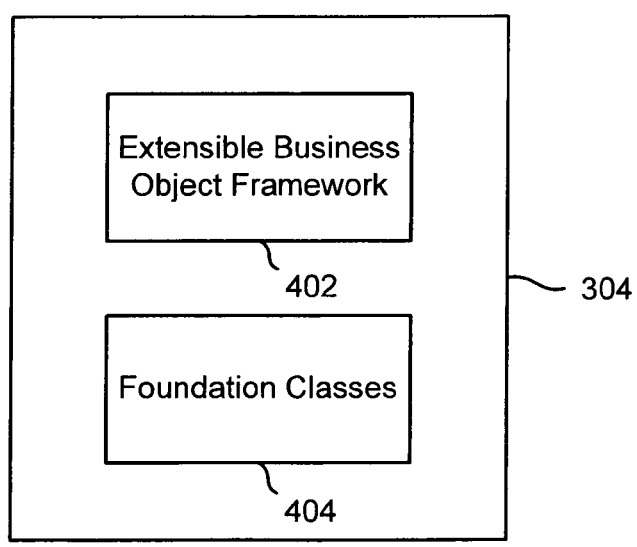
FIG. 4 is a block diagram illustrating an embodiment of a content management framework.

FIG. 4 is a block diagram illustrating an embodiment of a content management framework. In the example shown, content management framework 304 includes an extensible business object framework 402 and foundation (e.g., Java object) classes 404. In some embodiments, the business object framework 402 comprises part of foundation classes 404. The business object framework 402 in some embodiments enables an application developer, application or other code, or another user to define access restrictions to be associated with an item of content, e.g., by specifying access rights and/or restrictions to be included in an access control list (ACL) or like structure associated with the item of content. In some embodiments, an ACL is linked to and stored with metadata associated with the item(s) of content to which the ACL applies. In some embodiments, an ACL is implemented as a software object stored persistently with, e.g., in a metadata store such as a database, and linked to an implementation object configured to represent and/or provide content management functionality with respect to one or more associated items of content.

In some embodiments, business logic and/or services associated with and/or comprising business object framework 402 enforce access restrictions. Methods requiring access of a content item are configured and/or modified or supplemented as required, at the business logic/platform level, to enforce restrictions. For example, in some embodiments a query is modified, if applicable, to ensure that only results a user/process associated with the query is permitted to access are returned, e.g., by adding to a query a "where" clause that ensures that the results return include only items that (1) satisfy one or more search criteria indicated by a user and (2) the user has a right to access (e.g., view or browse). In some embodiments, session data is used to determine whether access to a particular content item(s) should be granted. An application seeking to access managed content on behalf of a user (individual, system, client or other application, process, etc.) obtains from the user and/or provides to the content management system a credential, such as a user/account name and password, and establishes with the content management system a session through which access to managed content can be requested and/or provided. The content management system maps the credential data to a set of access qualifying data for the session, e.g., by identifying any user name or other identifier, group memberships, roles, or other information by which in a given installation a user may be granted access rights. Requests received by the content management system (e.g., business logic, content server, etc.) from an application are associated with a corresponding session and access is granted to the extent authorized for that session. For example, in a session associated with a user "Bob" who is a member of the "Engineering Group", access in some embodiments would be granted only to content items for which the corresponding ACL grants rights explicitly to "Bob", the "Engineering Group", or both. Realizing security/access restrictions at the business logic/content management platform level ensures that such measures are applied uniformly regardless of the application and/or other vehicle used to access (or attempt to access) content.

Figures 5, 6:
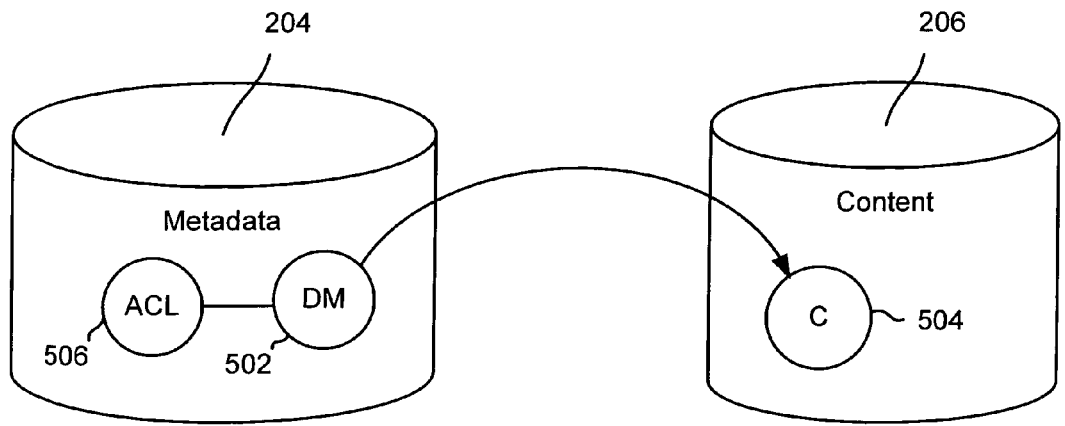
FIG. 5 is a block diagram illustrating an embodiment of elements associated with a content system.
FIG. 6 is a block diagram illustrating an embodiment of an access control list.

FIG. 5 is a block diagram illustrating an embodiment of elements associated with a content system. In the example shown, an implementation object 502 stored in metadata store 204 is associated with a corresponding content item 504 stored in content store 206. The implementation object 502 represents the content item 504 in a body of managed content with which both are associated. FIG. 5 illustrates a simple example in which there is a one-to-one relationship between implementation object 502 and content item 504, but in some embodiments a single implementation object (or related set of objects) may be associated with two or more content items and/or a single content item may be associated with two or more implementation objects (e.g., to avoid duplicative storage of content). In the example shown, access control is provided at least in part by associating (e.g., linking) with implementation object 502, in metadata 204, ACL object 506. In some embodiments, ACL object 506 includes data indicating one or more access rights and/or restrictions for one or more users and/or groups of users. In some embodiments, certain methods and/or operations associated with a content management system with which the elements shown in FIG. 5 are associated access attributes and/or invoke methods of ACL object 506 to ensure that access rights/restrictions specified by/through ACL object 506 are enforced. In the query example described above, for example, in some embodiments access right/restriction data associated with ACL object 506 would be used to ensure that only content items a user associated with a session with which a query is associated are included in results returned in response to the query. In some embodiments, a call to a method associated with implementation object 502, such as to create a new version and/or check associated content item 504 in/out, are intercepted and/or not (fully) executed unless the user/session with which the call is associated has the access rights required, as determined by checking the data and/or invoking one or more methods of ACL object 506. In some embodiments, the called method of implementation object 502 is configured to check an attribute and/or invoke a method of ACL object 506 to determine if the user/session has the required access rights.

In some embodiments, the access privileges granted, e.g., through an ACL such as ACL object 506 of FIG. 5, may include rights/privileged expressed as one or more hierarchical or extended (non-hierarchical) "permits". Examples of hierarchical permits, listed in order from least to greatest access rights, include the following: none (no rights); browse (e.g., see metadata or summary data but not underlying content); read (view contents); relate (e.g., link to other contents/objects/contexts/logical structures); version (e.g., can save and edit as a new version but cannot save changes to original); write (e.g., can edit current version/instance and saved edited content in place of original); and delete (e.g., can delete content and/or associated metadata). In some embodiments, unless otherwise indicated a grant of a hierarchical access permit gives to the recipient of the grant the privileges associated with the permit and those of all levels below the granted permit in the hierarchy of permits. In the above example, a user granted "write" privileges with respect to a content item could also browse, read, relate, and version the content item. In some embodiments, in addition to and/or instead of hierarchical permits, one or more non-hierarchical (sometimes referred to herein as "extended") permits may be granted. For example, in some embodiments, an "extended delete" permit may be granted, e.g., to a system or data/backup administrator, to enable the administrator to delete content as allowed/required by a data retention policy without being able to read, write, version, etc., the content. Other examples of extended permits include "change permission" (e.g., limited rights to an author and/or administrator to change the access privileges, within limits, of one or more other users without necessarily giving the author/administrator those privileges, or any others) and "execute" for content items and/or other resources (e.g., application code, business logic, or portions thereof) capable of being executed (e.g., run).

FIG. 6 is a block diagram illustrating an embodiment of an access control list. In the example shown, ACL 600 includes three entries, a first granting "write" access to a user named "Joe", a second granting "read" access to a group named "Eng Dept" (short for "engineering department" in this example), and a third granting "delete" access to a user (or role) named "admin" (short for "administrator" in this example). In some embodiments, a request to "delete" a content item associated with ACL 600 would be allowed only if a session associated with the request were associated with the user "admin". Either "admin" or "Joe" would be permitted to write (e.g., edit and save as the same version) to the content item, and members of the engineering group would be permitted to read, but not write, version, etc., the content item.

Figure 7:
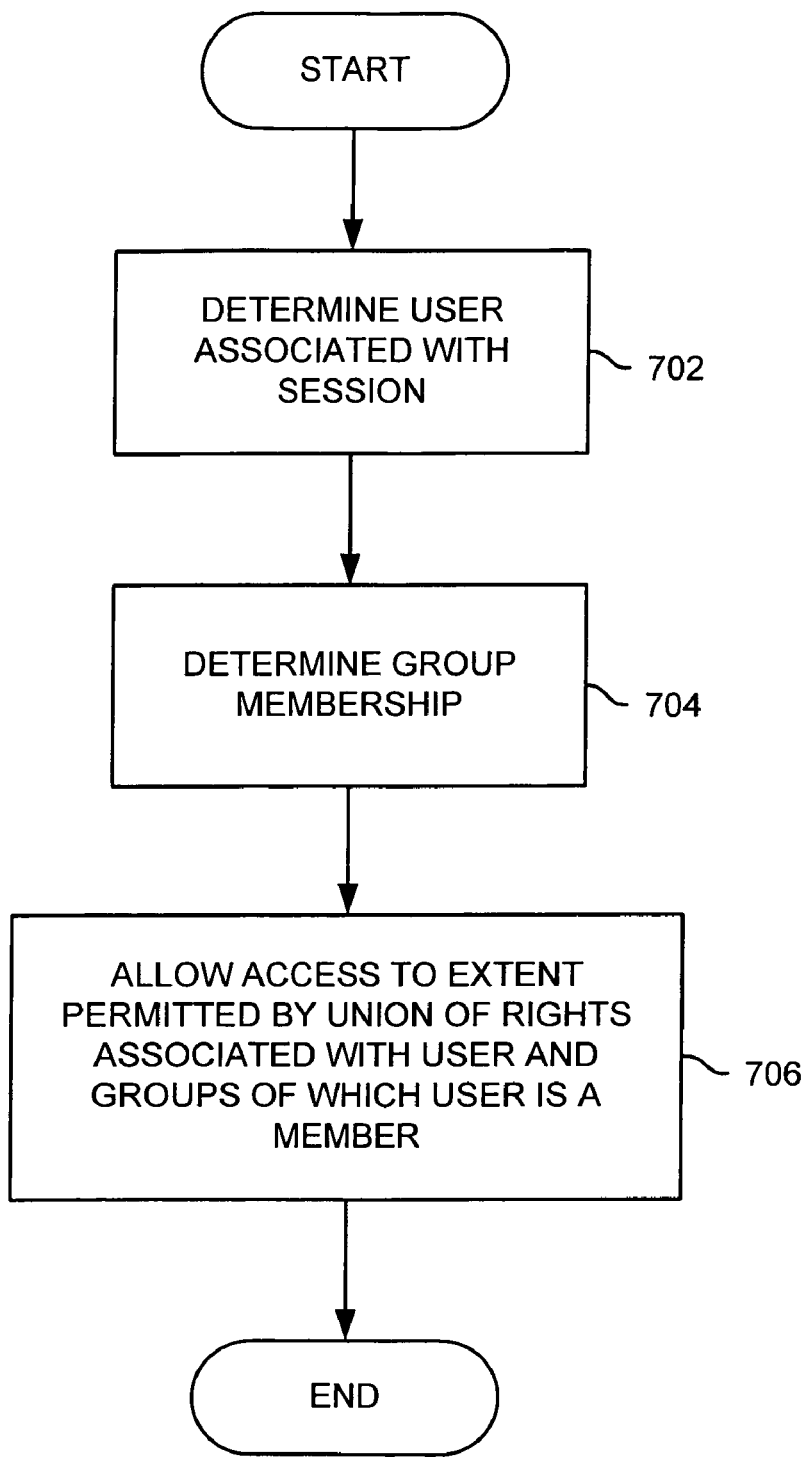
FIG. 7 is a flow chart illustrating an embodiment of a process for controlling access to managed content.

FIG. 7 is a flow chart illustrating an embodiment of a process for controlling access to managed content. In the example shown, at 702 a user associated with a session established or being established or requested to be established with a content management system is determined. In various embodiments, the user may be an individual, a role, a group, a system, a node, and/or an application or other process or logic. At 704, the group memberships, if any and as applicable, of the user determined at 702 are determined. In some embodiments, a user may be a member of one or more groups by virtue of his/her role or title, membership in other groups, and/or being listed individually in a list or other data indicating members of the group(s). For example, an employee "Bob" who is a "manager" in the "engineering department" and assigned to the "Western Region" would be allowed to access a content item for which the ACL granted rights to at least one of "Bob" individually, the "manager" role, the "engineering department" group, and the "Western Region" group. In some embodiments, 706 includes comparing, each time access to a content item is requested, the individual(s), role(s), and group(s) associated with a session with which the request is associated with the grant(s) of rights in an ACL associated with the content item to determine if any entity associated with the session has been granted access at the level required/requested.

Specifying a "required group" of which a user/session must be a member in order to access a content item is disclosed. In some embodiments, the required group is specified in an ACL and enforced by business logic associated with a content management platform. In some embodiments, a user/session that is not a member of a required group is denied access to the content item, even if the user/session would have been allowed access but for not being a member of the required group, e.g., by virtue of an access permit explicitly granted to the user/session, for example in an ACL (or other structure) in which the required group restriction is specified. In some embodiments, if multiple required groups are specified, a user/session must be a member of any/all required groups to gain access. In some embodiments, a hierarchical or other permit is or may optionally be specified for a required group. In some embodiments, a user/session that is a member of any/all required groups is granted access at the highest level for which the user/session qualifies by virtue of a permit granted to the user/session in an ACL apart from their membership in any/all required groups, e.g., a permit granted to them individually, by virtue of their role, by virtue of their membership in a group other than a required group, etc.

FIG. 8A is a block diagram illustrating an embodiment of an access control list. In the example shown, ACL 800 includes four entries, a first granting "write" access to "Joe", a second granting "read" access to the "Eng Dept" group, a third granting "delete" access to "admin", and a fourth indicating that "Project Alpha" is a "required group". In this example, the user "Joe" would be granted access only if he were a member of the "Project Alpha" group. If a member of the "Project Alpha" group, Joe would be granted "write" access by virtue of the first entry in ACL 800. Likewise, a member of the "Eng Dept" group would be granted access only if he/she were a member of the "Project Alpha" group. A requesting member of the "Eng Dept" who was also a member of the "Project Alpha" group (and who was not "Joe" or "admin") would be granted "read" access by virtue of the second entry in ACL 800.

FIG. 8B is a block diagram illustrating an embodiment of an access control list. In the example shown, ACL 810 includes four entries, a first granting "write" access to "Joe"; a second granting "read" access to the "Eng Dept" group; a third granting "delete" access to "admin"; and a fourth specifying that the "Project Alpha", "Eng Mgr" (short for "engineering manager in this example), and "QA Team" (short for "quality assurance team" in this example) groups comprise a "required group set". In this example, to gain access a user/session would have to be a member of at least one of the groups comprising the "required group set". For example, "Joe" would be allowed access only if he were a member of at least one of the "Project Alpha" group, the "Eng Mgr" group, and/or the "QA Team" group. If "Joe" were a member of at least one of the three groups comprising the "required group set", he would be allowed "write" access by virtue of the first entry in ACL 810.

FIG. 8C is a block diagram illustrating an embodiment of an access control list. In the example shown, ACL 820 includes four entries, a first granting "write" access to a user named "Joe", a second granting "read" access to a group named "Eng Dept" (short for "engineering department" in this example), a third specifying a "read restrict" limitation on the rights of "Mark", and a fourth granting "delete" access to a user (or role) named "admin" (short for "administrator" in this example). In this example, even if "Mark" were a member of the "Eng Dept" group, he would not be granted "read" access to a content item associated with ACL 820. Such a restriction may be useful, e.g., to avoid giving a user access to content associated with projects from which the user has been segregated for ethical, legal, business, or other reasons, e.g., to ensure that a key product is not tainted through involvement by an employee recruited and/or hired away from a competitor, or where a user cannot be allowed to access the content due to a personal, professional, or other conflict of interest.

FIG. 8D is a block diagram illustrating an embodiment of an access control list. In the example shown, ACL 830 includes four entries, a first granting "write" access to a user named "Dan", a second granting "read" access to a group named "State Dept", a third indicating that "Top Secret" is a "required group", and a fourth indicating that "European Region" is a "required group". In this example, a State Department employee would be allowed access to a content item associated with ACL 830 only if the employee both had a "top secret" (or higher) security clearance and was associated with the "Europe Region". A State Department employee with a top secret (or higher) clearance but assigned to a region other than Europe would not have access. Likewise, even "Dan", who is specifically delegated "write" access in the first entry, would be denied access unless he had a top secret or higher security clearance and was assigned to Europe. The example shown in FIG. 8D illustrates application in the context of government security marking and access control requirements, such as the Department of Defense Information Security Program, of the "required group" approach described herein, including by providing a mechanism to associate with electronically stored content and enforce access restrictions associated with security classification markings ("Confidential", "Secret", "Top Secret", etc.) and supplemental and/or other applicable associated markings ("US Citizen Only", "Europe Region Only", etc.).

Figure 9:
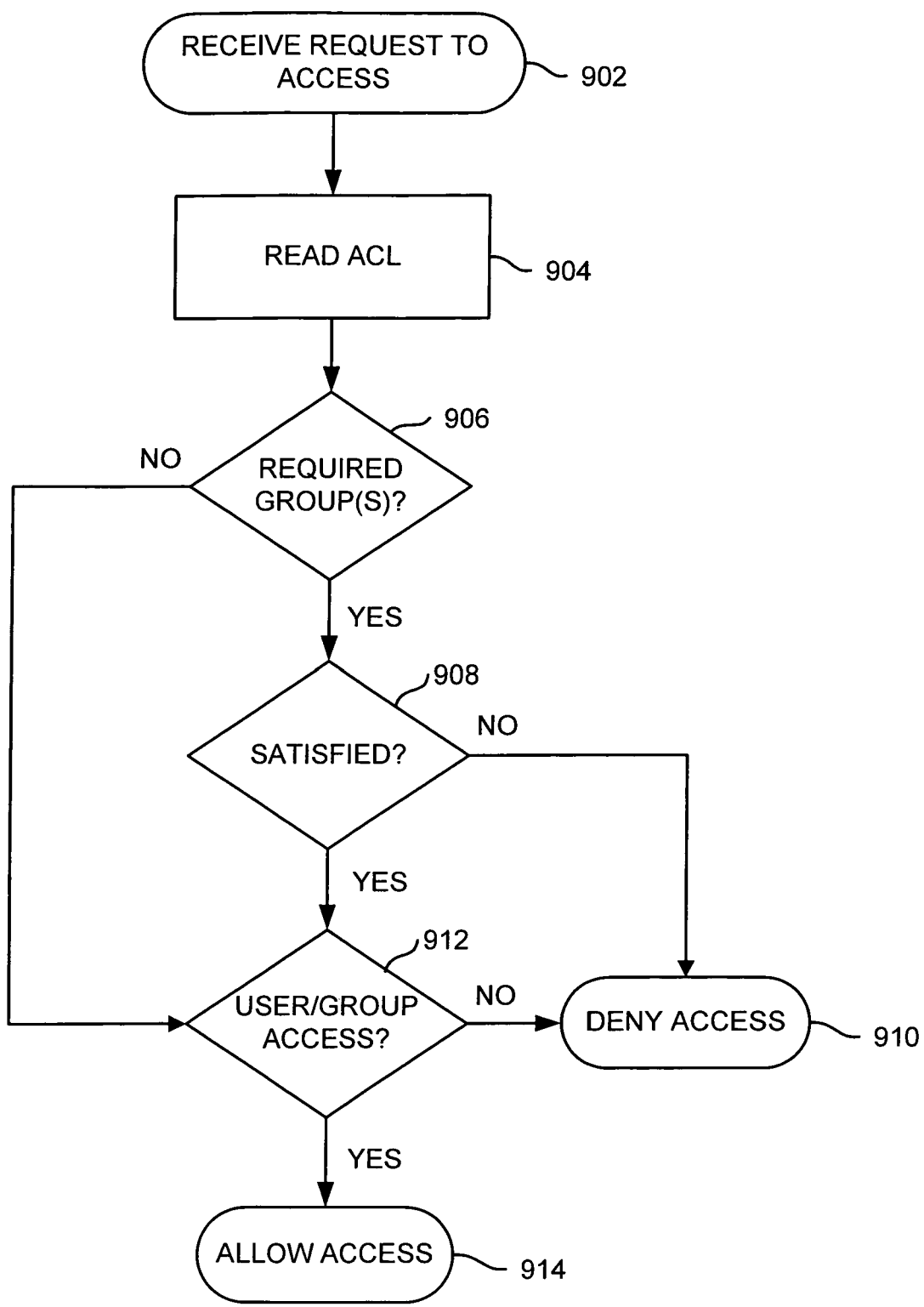
FIG. 9 is a flow chart illustrating an embodiment of a process for controlling access to electronically stored content.

FIG. 9 is a flow chart illustrating an embodiment of a process for controlling access to electronically stored content. In the example shown, at 902 a request to access a content item is received. In some embodiments, the request received at 902 is received by a content management system and/or a component, process, or service thereof. At 904, an ACL associated with the content item is read. It is determined at 906 whether the ACL specifies any required group(s). If so, it is determined at 908 whether all required groups are satisfied. If any require group(s) is/are not satisfied, at 910 access is denied. If all required groups are satisfied, or if there are no required groups, at 912 it is determined whether a user with which the request received at 902 is associated is granted access to the content item apart from satisfying any/all required group(s), e.g., by virtue of an access permit granted in/via the ACL to the user, a role associated with the user, or a group of which the user is a member. If there is no permit that grants access to the user, at 910 access is denied. If the user has been granted access, access is allowed at 914.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling access to managed content, comprising:
   receiving at a content management system a request associated with a user to access a content item included in a body of managed content;
   reading an access control list associated with the content item;
   determining at the content management system whether the user is granted an access right based on one or more entries included in the access control list;
   determining at the content management system whether the user is a member of an aggregated required group, comprising one of the following:
      determining the aggregated required group based on one individual required group if the access control list includes only one individual required group; and
      determining the aggregated required group by combining two or more individual required groups using one or more AND operations or OR operations if the access control list includes two or more individual required groups; and
   providing access to the user if the user is granted the access right and further is a member of the aggregated required group.

2. The method as recited in claim 1, wherein the request is received from an application running on a framework associated with the content management system.

3. The method as recited in claim 1, wherein the determination whether the user is a member of the aggregated required group is made by business logic associated with the content management system.

4. The method as recited in claim 1, wherein determination whether the user is a member of the aggregated required group is based at least in part on one or more of the following: an individual identity of the user, a security classification or level of the user, a group of which the user is a member, a role associated with the user, a supplemental security classification associated with the user, a session data associated with the user, and a session data associated with the request.

5. The method as recited in claim 1, wherein the requested access comprises one or more of the following types of access: browse, read, relate, version, write, and delete.

6. A content management system, comprising:
   a communication interface configured to receive a request to access a content item included in a body of managed content; and
   a processor coupled to the communication interface and configured to:
   read an access control list associated with the content item;

determine at the content management system whether the user is granted an access right based on one or more entries included in the access control list;

determine at the content management system whether the user is a member of an aggregated required group, comprising one of the following:

determine the aggregated required group based on one individual required group if the access control list includes only one individual required group; and determine the aggregated required group by combining two or more individual required groups using one or more AND operations or OR operations if the access control list includes two or more individual required groups; and provide access to the user if the user is granted the access right and further is a member of the aggregated required group.

7. The system as recited in claim 6, further comprising a content store configured to store the content item.

8. The system as recited in claim 6, further comprising a metadata store configured to store the access control list and a linking data associating the access control data with the content item.

9. A computer program product for controlling access to managed content, the computer program product being embodied in a non-transitory computer readable storage medium and comprising computer instructions which when executed by a computer cause the computer to perform the steps of receiving at a content management system a request to access a content item included in a body of managed content;

reading an access control list associated with the content item;

determining at the content management system whether the user is granted an access right based on one or more entries included in the access control list;

determining at the content management system whether the user is a member of an aggregated required group, comprising one of the following:

determining the aggregated required group based on one individual required group if the access control list includes only one individual required group; and determining the aggregated required group by combining two or more individual required groups using one or more AND operations or OR operations if the access control list includes two or more individual required groups; and providing access to the user if the user is granted the access right and further is a member of the aggregated required group.

10. The computer program product as recited in claim 9, wherein determination whether the user is a member of the aggregated required group is based at least in part on one or more of the following: an individual identity of the user, a security classification or level of the user, a group of which the user is a member, a role associated with the user, a supplemental security classification associated with the user, a session data associated with the user, and a session data associated with the request.

11. The method as recited in claim 1, wherein determining whether the user is a member of the aggregated required group comprises using session data.

12. The system as recited in claim 6, wherein determining whether the user is a member of the aggregated required group comprises using session data.

13. The computer program product as recited in claim 9, wherein determining whether the user is a member of the aggregated required group comprises using session data.

14. The system as recited in claim 6, wherein the request is received from an application running on a framework associated with the content management system.

15. The system as recited in claim 6, wherein the determination whether the user is a member of the aggregated required group is made by business logic associated with the content management system.

16. The system as recited in claim 6, wherein determination whether the user is a member of the aggregated required group is based at least in part on one or more of the following: an individual identity of the user, a security classification or level of the user, a group of which the user is a member, a role associated with the user, a supplemental security classification associated with the user, a session data associated with the user, and a session data associated with the request.

17. The system as recited in claim 6, wherein the requested access comprises one or more of the following types of access: browse, read, relate, version, write, and delete.

* * * * *